July 7, 1959
C. H. BROWN
2,894,110
WATER-HEATING APPARATUS FOR USE IN MAKING HOT BEVERAGES
Filed Nov. 4, 1957
2 Sheets-Sheet 1
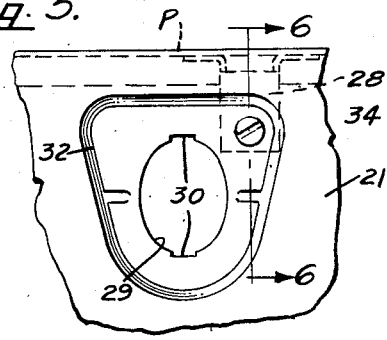
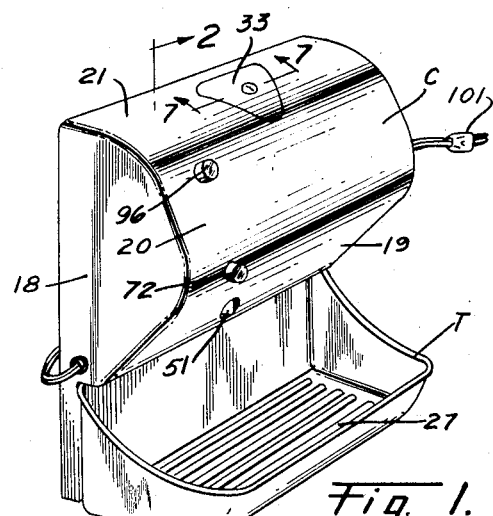
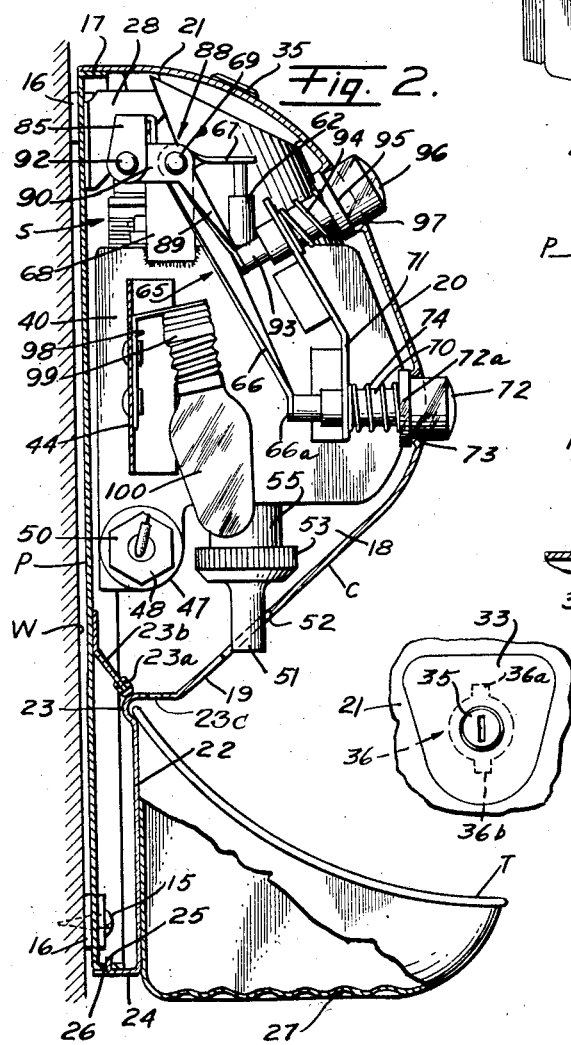
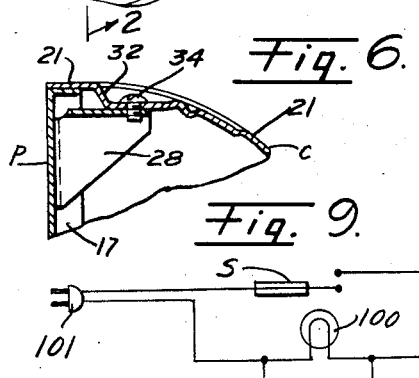
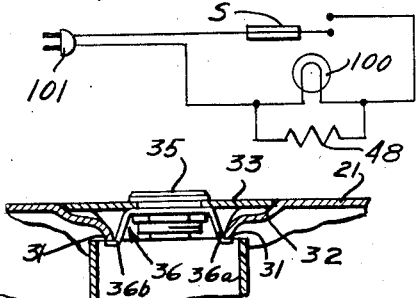
Charles H. Brown,
INVENTOR.
BY *Edwin D. Towers*
Attorney

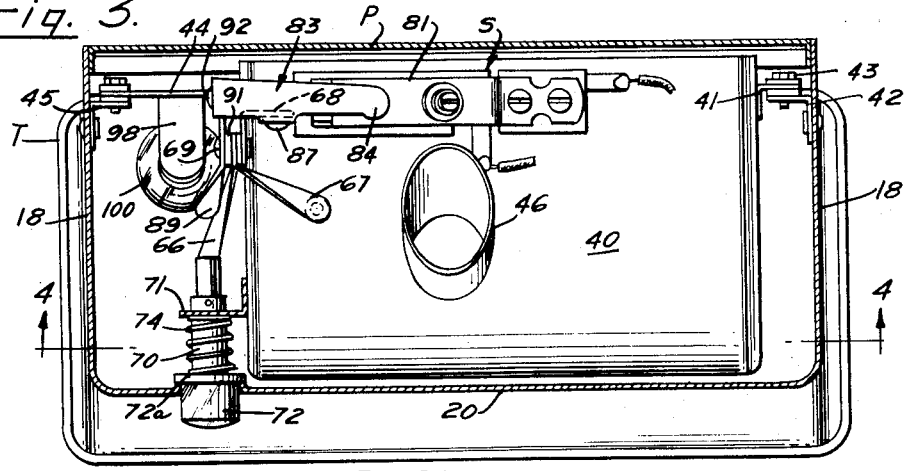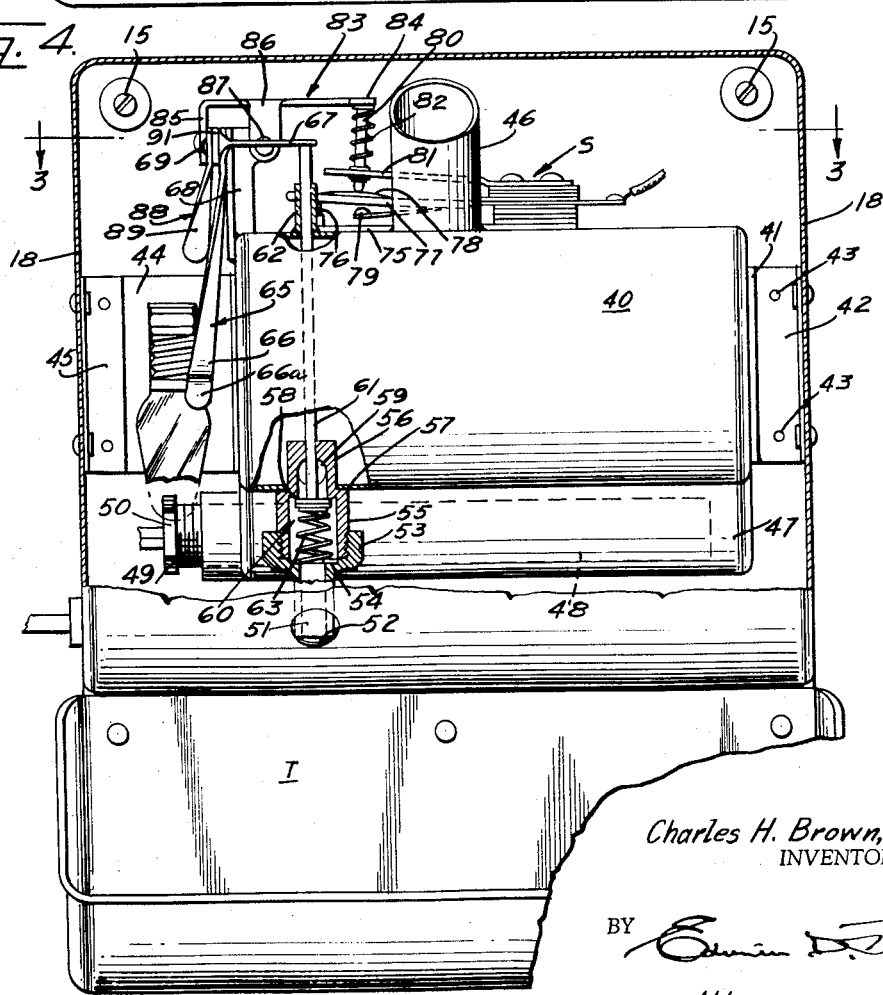

United States Patent Office 2,894,110
Patented July 7, 1959

2,894,110
WATER-HEATING APPARATUS FOR USE IN MAKING HOT BEVERAGES

Charles H. Brown, San Diego, Calif., assignor to Morning Coffee, Inc., San Diego, Calif., a corporation of California Application November 4, 1957, Serial No. 694,416

3 Claims. (Cl. 219—38)

My invention relates to water-heating apparatus of the character embodied in my copending application Serial No. 617,535, filed October 22, 1956, now patent No. 2,819,377 which is particularly designed to automatically heat water in relatively small quantities for use in the making of hot beverage for individual consumption, and whereby one may quickly make his own beverage when and as desired.

It is a purpose of my invention to provide a water-heating apparatus which is characterized by its structural simplicity, low cost of manufacture, and easy mode of operation to electrically heat water as desired.

It is also a purpose of my invention to provide a water-heating apparatus which embodies a tank for the water to be used in the making of a hot beverage; an electrical-heating element in the tank; a manually closable thermostatic switch for initiating supply of electrical current to the heating element, which automatically opens once the water in the tank becomes heated to a temperature suitable for hot beverage making to disrupt the supply of current to the heating element. Moreover, the apparatus includes a lamp to visibly indicate to the user when the current supply to the heating element is initiated and discontinued.

A further purpose of my invention is the provision of a water-heating apparatus which embodies an outlet through which water may be discharged from the tank, a valve for controlling discharge of water from the outlet, and a novel form of manually-operable mechanism for opening the valve.

Another purpose of my invention is the provision in a water-heating apparatus of this character, of a novel form of manually-operable mechanism for closing the thermostatic switch.

Another purpose of my invention is to provide a water-heating apparatus which includes a casing containing the parts of the apparatus, and a plate for mounting the casing on a wall and at the same time closing the casing, and means for locking the casing to the plate to prevent surreptitious removal of the casing from the plate.

I will describe only one form of water-heating apparatus embodying my invention and will then point out the novel features thereof in claims.

In the accompanying drawings:

Fig. 1 is a view showing in perspective one form of water-heating apparatus embodying my invention.

Fig. 2 is an enlarged vertical sectional view taken on the line 2—2 of Fig. 1.

Fig. 3 is a horizontal sectional view taken substantially on the line 3—3 of Fig. 4.

Fig. 4 is a vertical sectional view taken substantially on the line 4—4 of Fig. 3.

Fig. 5 is an enlarged fragmentary top plan view showing the entrance opening in the casing for gaining access to the filling spout of the tank, and the surrounding structure of the casing which provides a seat for the cover plate shown in Figs. 1 and 2.

Fig. 6 is a vertical sectional view taken on the line 6—6 of Fig. 5.

Fig. 7 is an enlarged sectional view taken on the line 7—7 of Fig. 1.

Fig. 8 is a top detail plan view of the cover plate showing the locker member in broken lines.

Fig. 9 is a view showing diagrammatically an electrical circuit embodying the electrical elements of my invention.

Referring more particularly to the drawings of my invention, the water-heating apparatus comprises, in the present instance, a plate P for mounting a casting C and a tray T on a vertical wall W. The plate P is made of sheet metal and is of flat rectangular form. It is secured to the wall W at the four corners thereof by means of screws 15 extending through grommets 16, preferably formed of rubber. At all of its edges the plate P is provided with right angular flanges 17 which are adapted to be utilized for mounting the casing C on the plate.

The casing C is constructed of metal that may be stamped from a single sheet to form end walls 18 connected by a bottom wall 19 which is inclined upwardly to a front wall 20 of generally arcuate form, and a top wall 21. Integral with the bottom wall 19 is a depending vertical wall 22 which, at its upper end, is formed with a rounded portion 23. The side and bottom edges of the wall 22 are formed with flanges 24, the bottom one of which engages beneath the bottom flange 17 of the plate P and is secured thereto by tongues 25 on the flange 24 that extends upwardly into slots 26 in the plate flange. It will be understood that when the tongues are engaged within the slots and the sides and top of the casing engage the other plate flanges, the casing as a whole is mounted on the plate P.

As best shown in Fig. 2, the rounded portion 23 abuts the rubber-covered edge 23a of a spring-metal flange 23b which is welded to the plate P. The rounded portion, the edge and the flange extend completely across the casing and the plate. When mounting the casing C on the plate P the portion 23 presses against the edge 23a to flex the flange 23b and thus place it under tension. This not only prevents rattling of the casing on the plate but it forms a water-tight seal between the plate and casing at this point, as well as to direct any water overflowing from the tank during filling thereof, through an opening 23c and into the tray T.

Not only to provide a platform upon which a beverage cup may be supported beneath a water-outlet spout, but to catch any drippings from the spout, the tray T is provided. This tray has the form illustrated and is preferably provided with a corrugated bottom 27. The tray is welded or otherwise secured to the wall 22 of the casing and is of a length corresponding thereto.

For locking the casing C against removal from the plate P, primarily to prevent theft of the apparatus, that is, detachment of the casing C from the plate P, a bracket 28 is welded to the front side of the plate P adjacent the top thereof. To one side of this bracket an opening 29 is provided in the top casing wall 21, such opening being of ovate form and the wall thereof provided at diametrically opposite points with notches 30.

Around this opening 29 the wall 21 is bent inwardly, so that the edge of the opening provides a keeper 31 and a recess 32 for the reception of a cover plate 33. This recess 32 is of substantially triangular form, as is the cover plate 33, and it is of such area that the upper end of the bracket 28 is disposed directly beneath one corner thereof where it is provided with a suitable opening through which a fastening screw 34 is extended to engage the bracket for securing the casing in place on the plate P.

To prevent access to this screw 34 the cover plate 33 has rotatably mounted therein a conventional form of key-controlled lock 35 that has a latch member 36 fixed thereto of the construction shown in Figs. 7 and 8. As here shown the latch member has two depending arms 36a terminating in tongues 36b which when aligned with the recesses 30 permit extension thereof through the opening to the lower side of the edges of the opening. Thus by turning the lock 35, the latch member 36 can be rotated to bring the tongues 36b beneath the edges of the opening 29, thus securing the cover plate 33 to the casing and in covering relation to the opening.

Within the casing C is a water tank 40 which is secured horizontally therein at one end by a bracket 41 welded to the end wall of the tank, and a second bracket 42 riveted to the adjacent end wall of the casing and secured to the bracket 41 by bolts 43. At its other end the tank is secured to the other end wall of the casing by a bracket 44 welded at one end to the casing end wall, and bolted at the other end to a bracket 45 riveted to the casing end wall.

The tank 40 at its top side has a filling spout 46 with an ovate entrance end that surrounds and extends above the opening 29 so as to prevent water introduced into the tank from spilling into the casing. Manifestly, this location of the spout 46 permits the tank to be filled with water upon removal of the cover plate 33.

The bottom of the tank 41 is formed with a rounded portion 47 coextensive in length therewith and open at one end to permit the insertion of a conventional electrical heating element 48 therein to heat the water in the tank. This element 48 is adapted to be secured within the tank portion 47 by a screw-threaded extension 49 which can be threaded into the open end of the tank portion by applying a wrench to a non-circular head 50.

To one side of the tank portion 47 a water-outlet spout 51 extends downwardly through an opening 52 in the casing wall 19. The upper end of this spout has an interior collar 53 which forms an annular seat 54 at the junction of the two. This collar 53 screw-threadedly engages a tube 55 depending from the lower end of a fitting 56 of reduced diameter to provide an intervening shoulder 57. The fitting extends upwardly through a suitable opening in the bottom of the tank 41 where it is welded, and this fitting is formed at its lower end with a seat 58 and a lateral passage 59 which provides communication between the interior of the tank and the tube 55.

For controlling discharge of water from the tank 41 through the passage 52 and ultimately from the outlet spout 51, a valve 60 is provided and contained within the tube 55. This valve is provided with an upwardly extending stem 61 slidably fitted in the fitting 56 and projecting at its upper end through a sleeve 62 secured on the top of the tank 41. The valve is urged to closed position on the seat 58 by a coiled spring 63 interposed between the valve and the seat 54.

Manually operated mechanism is provided for opening the valve 60 against the tension of the spring 63, and from a point exteriorly of the casing C. This mechanism comprises a bell-crank lever 65 having a long arm 66 and a short arm 67. The lever is fulcrumed on a bracket 68 welded to the left-hand end of the tank 40, by a pin 69. The long arm 66 is twisted so that its lower end 66a is normally disposed in a vertical plane. The short arm 67 is likewise twisted to normally position its free end horizontally, and in contact with the upper end of the valve stem 61.

The lever 65 is operable to depress the stem 61 against the tension of the spring 63 to open the valve 60, by means of a plunger or rod 70. This rod is mounted for axial movement in a bracket 71 welded to the adjacent end of the tank 40 and so that its inner end contacts with the flat end 66a of the arm 66. A collared button 72 is formed on the outer end of the rod 70 and is movable in an opening 73 formed in the front casing wall 20. Between the bracket 71 and the button 72 a coiled spring 74 is mounted on the rod 70 to urge the rod and button 72 to a position in which the flange 72a of the button abuts the flange wall of the opening 73.

To open the valve 60 the button 72 is pressed inwardly thereby causing the rod 70 to swing the arm 66 inwardly and thus rock the lever 65 about the pivot 69 causing the arm 67 to move downwardly thereby depressing the stem 61 and opening the valve.

For controlling the supply of current to the heating element 48, a thermostatic switch S is mounted on the top side of the tank 40. This switch is of conventional form and when once closed it remains closed until it is subjected to heat of a predetermined degree when it automatically opens. The switch includes a bimetal arm 75 normally contiguous to the top of the tank 40 and having on its free end a projection 76. A rigid arm 77 is positioned above the projection 76, and this arm carries a leaf spring 78 that is normally bowed downwardly to engage a contact 79 for closing the switch. By flexing the arm 75 upwardly the projection 76 bows the spring upwardly to move it out of engagement with the contact 79, and thus open the switch. The spring 78 is adapted to be bowed downwardly by means of a headed rod 80 mounted for axial movement in the free end of a rigid arm 81, a coiled spring 82 surrounding the rod between the head and the arm for urging the rod upwardly to a position in which its lower end is out of contact with the spring 78.

For moving the rod 80 downwardly to so bow the spring 78 as to close the switch, an arm 83 is provided. This arm at one end has a flat head 84 contacting with the upper end of the rod 80 and its other end bent to form a depending ear 85. Between its ends the arm 83 is formed with a depending ear 86 pivoted as at 87 on the bracket 68. As the arm 83 is so mounted, it will be clear that by movement thereof to depress the head 84 will operate to move the rod 80 downwardly against the tension of the spring 82 to bow the spring 78 downwardly and thus close the switch.

The arm 83 is actuated through the provision of a bell-crank lever 88 having a long arm 89 and a short arm 90. This lever is fulcrumed on the pin 69 and is maintained in spaced relation to the lever 65 by means of a washer 91. The free end of the arm 90 is pivotally connected to the ear 85 as at 92. The long arm 89 is twisted so that its free end is flat for flat engagement by the inner end of a rod or plunger 93. This rod is similar in construction to the rod 70, and likewise is mounted for axial movement in the bracket 71. By means of a coil spring 94 interposed between the bracket 71 and the flange 95 of a button 96 movable in an opening 97 in the front casing wall 20, the rod 93 is urged outwardly to a position in which the flange abuts the wall 20.

Upon pushing the button 96 inwardly against the tension of the spring 94 the rod 93 is actuated to swing the arm 89 and move the lever 88 so that the arm 90 swings the arm 83 about its pivot 87 to depress the head 84 against the tension of the spring 82 and thus move the rod 80 to close the switch S. Once the button 96 is relieved of pressure the spring 94 moves the rod 93 in the other direction to relieve the arm 89 of any pressure so that the arm 83 can move under the action of the spring 82 to restore the rod 80 back to its normal position. However, since the spring 78 has been bowed downwardly by operation of the lever 83, it remains in such position to maintain the switch closed until the bimetal arm 75 under the heat generated in the tank 40 flexes to, in turn, bow the spring 78 and thus open the switch.

As shown in Fig. 2 a bracket 98 is secured to the bracket 44, and this bracket 98 carries a lamp socket 99 in which a lamp 100 is secured. This lamp is provided for the purpose of signaling to the user that the switch S is closed and the heating element 48 is being energized to heat the water in the tank 40. Although the lamp is contained within the casing, the light rays therefrom can be seen by the user because the rods 70 and 93 and the buttons 72 and 96 are constructed of transparent Lucite. Thus light rays from the lamp cause the buttons to be illuminated.

As illustrated diagrammatically in Fig. 9, lamp 100, heating element 48, switch S and wall plug 101 are so included in a circuit that when the plug 101 is plugged into a wall socket and the switch closed, current will be supplied simultaneously to the lamp and the heating element.

In the use of the apparatus as mounted on the wall W the tank 40 can be filled with water through the spout 46 by first removing the cover plate 33. Through use of the proper key, the lock 35 can be turned to move the latch member 36 from the cover-securing position shown in Fig. 7, to the cover-releasing position shown in Fig. 8, thus allowing the cover plate to be removed to expose the spout 46 for the introduction of water into the tank. Once the tank is filled, the cover plate 33 is replaced and relocked so that no one other than the person possessing the proper key can gain access to the screw 34 and detach the casing C from the mounting plate P.

To heat the water in the tank button 96 is pushed inwardly thus actuating lever 88 to close switch S and thereby supply current from the plug 101 to both the lamp and the heating element 48. As a consequence, both buttons 72 and 96 are illuminated indicating to the user that switch S is closed and the heating element is heating the water in the tank. Once the water is heated to a temperature suitable for use in the making of coffee, or any other hot beverage, the switch S automatically opens thus disrupting the circuit to deenergize the heating element and extinguish the lamp. When the lamp is extinguished it indicates to the user that the water is ready for beverage use.

Heated water can be dispensed from the tank 40 as required for making a cup of coffee, for example, by first placing in the empty cup a quantity of "instant" coffee and then placing the cup on the tray T directly beneath the outlet spout 51. Upon pressing the button 72 inwardly the lever 65 is actuated to open valve 60, thereby allowing hot water to be discharged into the cup. Once the cup is filled, the button is relieved of pressure to allow the valve 60 to close and thus discontinue further water discharge.

Although I have herein shown and described only one form of water-heating apparatus for use in making hot beverages embodying my invention, it is to be understood that various changes and modifications may be made therein without departing from the spirit of the invention and the spirit and scope of the appended claims.

What I claim is:

1. A water-heating apparatus, including: a casing; a tank for water within the casing; an electrical heating element within the tank; a switch within the casing and electrically connected to said element; a member operable to close the switch; a thermostat for opening the switch; a bell-crank lever fulcrumed on the tank; another lever fulcrumed on the tank and operatively connected to one arm of the bell-crank lever and to the member; a plunger; means mounting the plunger in the casing for axial movement and so that when moved in one direction it actuates the other arm of the bell-crank lever thereby moving the first-mentioned arm thereof to actuate said other lever and thereby move the member to close the switch; a spring for urging the plunger in the other direction; and a button on the plunger projecting from the casing in the urged position of the plunger so that it can be pressed inwardly of the casing and against the tension of the spring to move the plunger in the first-mentioned direction.

2. A water-heating apparatus, including: a casing; a tank for water within the casing; an electrical heating element within the tank; a switch within the casing and electrically connected to said element; a thermostat for opening the switch; an arm fixed on the tank; a lever fulcrumed on the tank; a rod fixed to one end of the lever and movable in the arm for closing the switch; a spring about the rod between said lever end and the arm for urging the lever in one direction about its fulcrum; a bell crank fulcrumed on the tank and having one arm thereof pivotally connected to the other end of said arm so that by movement of the bell crank in one direction said lever is moved in the other direction about its fulcrum and against the tension of the spring to move the rod through said arm and close the switch; a plunger mounted for movement in the casing axially in one direction to move the bell crank in the aforesaid direction; and a spring for urging the plunger in the other direction and to a position in which one end thereof projects from the casing.

3. A water-heating apparatus, including: a casing having an opening in its top; a tank for water within the casing; a filling spout on the tank communicating with the opening; an outlet spout in the bottom of the tank extending through the bottom of the casing; a valve controlling discharge of water from the tank through the outlet spout; a spring for urging the valve to closed position; a stem fixed to the valve and extending upwardly through the tank; a first bracket fixed on the tank; a first bell crank fulcrumed on the bracket and having one arm depending from the fulcrum and the other arm extending laterally from the fulcrum with its free end directly above the upper end of the stem; a second bracket fixed to the tank; a spring-loaded first plunger mounted in the second bracket and casing for axial movement so that when pressed inwardly against the tension of its spring it moves said depending arm to in turn move said other arm so as to depress the stem and open the valve; an electrical heating element within the tank; a switch supported on the tank and electrically connected to said element; a thermostat for opening the switch; an arm fixed on the tank; a lever fulcrumed on the first bracket; a rod fixed to one end of the lever and movable in the arm for closing the switch; a spring about the rod between said lever end and the arm for urging the lever in one direction about its fulcrum; a second bell crank fulcrumed on the first bracket and having one arm thereof pivotally connected to the other end of said arm so that by movement of the bell crank in one direction the lever is moved in the other direction about its fulcrum and against the tension of the spring to move the rod through said arm and close the switch; and a spring-loaded second plunger mounted in the second bracket and casing for axial movement against the tension of its spring so that when pressed inwardly it moves the second bell crank in the aforesaid direction.

References Cited in the file of this patent

UNITED STATES PATENTS

| | | |
|---|---|---|
| 1,646,614 | Frye et al. | Oct. 25, 1927 |
| 1,920,013 | Green | July 25, 1933 |
| 2,492,769 | Snell | Dec. 27, 1949 |
| 2,537,167 | Snyder | Jan. 9, 1951 |
| 2,611,501 | Bermann | Sept. 23, 1952 |
| 2,641,681 | Willman | June 9, 1953 |
| 2,643,322 | Lime et al. | June 23, 1953 |
| 2,732,467 | Slate | Jan. 24, 1956 |
| 2,748,973 | Rockola | June 5, 1956 |
| 2,767,960 | Fast | Oct. 23, 1956 |
| 2,780,711 | Visos | Feb. 5, 1957 |
| 2,784,879 | Fischer | Mar. 12, 1957 |
| 2,819,377 | Brown | Jan. 7, 1958 |